Jan. 27, 1953     J. BLAZEJ     2,626,442
SNAP FASTENER SOCKET ASSEMBLY
Filed Aug. 29, 1949
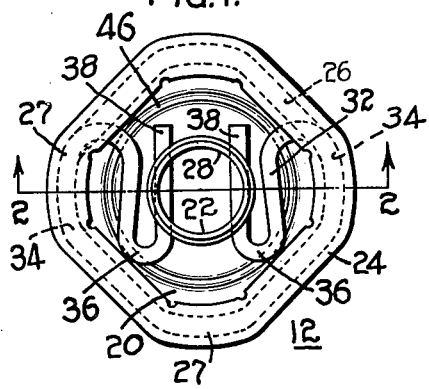
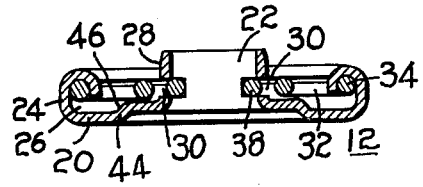
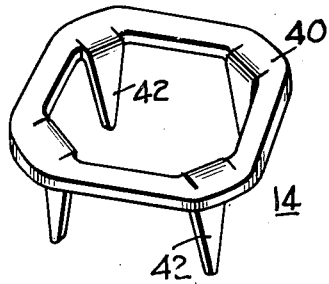
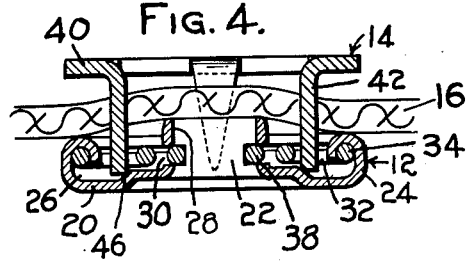
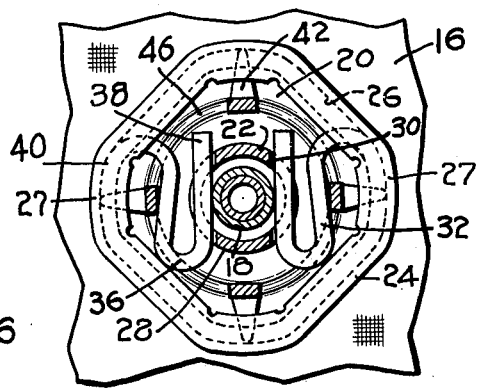
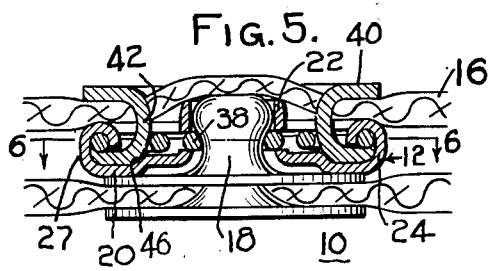
INVENTOR:
JOSEPH BLAZEJ,
BY Walter S. Jones
ATTORNEY.

Patented Jan. 27, 1953

2,626,442

UNITED STATES PATENT OFFICE 2,626,442

SNAP FASTENER SOCKET ASSEMBLY

Joseph Blazej, Chicago, Ill., assignor to United-Carr Fastener Corporation, Cambridge, Mass., a corporation of Massachusetts Application August 29, 1949, Serial No. 112,920

2 Claims. (Cl. 24—218)

This invention relates to snap fasteners, and has particular reference to a snap fastener socket assembly adapted to be readily attached to a supporting sheet of cloth or the like and to an attaching cap for use in such assembly.

The object of the invention is to provide a snap fastener socket assembly in which a socket member having a multi-looped stud-engaging spring and an attaching member having attaching prongs are shaped and arranged to be assembled on opposite sides of a supporting sheet so that the prongs pierce the sheet and engage the socket member without interfering with the action of the spring.

A further object of the invention is to provide a snap fastener socket assembly in which a socket member having a multi-looped spring is provided with outwardly extending corners for receiving prongs of an attaching member without interfering with the action of the spring.

A still further object of the invention is to provide a snap fastener socket assembly comprising a substantially square socket member having a spring with stud-engaging arms disposed diagonally across opposite corners of the socket member and an attaching member having prongs adapted to engage the socket in the corners of the square.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a plan view of a socket member adapted for use in the socket assembly of the invention;

Fig. 2 is a view in section taken on line 2—2 of Fig. 1;

Fig. 3 is a perspective view of a pronged attaching member for use in the socket assembly;

Fig. 4 is a view in elevation, partly in section, of the component parts of the socket assembly during attachment to a supporting sheet;

Fig. 5 is a view in elevation, partly in section, of the component parts of the socket assembled on a supporting sheet and a stud member snapped into engagement therewith; and Fig. 6 is a view in section taken on line 6—6 of Fig. 5, showing the arrangement of the attaching prongs in relation to the socket member.

Referring to the drawing, there is illustrated a snap fastener socket assembly 10, comprising a socket member 12 and an attaching member 14 which are adapted to be assembled on opposite sides of a supporting sheet 16, for snapping engagement with a stud 18.

In the preferred form, the socket member is substantially square, and comprises a base 20, a stud-receiving portion 22 disposed centrally in the base, and an upwardly and inwardly turned portion 24 about the periphery forming a recess 26. The corners 27 of the square base may be rounded as illustrated to improve the appearance of the fastener and to facilitate attachment as will be hereinafter described. The stud-receiving portion 22 may be conveniently formed by providing an upwardly extending cylindrical portion 28 having a pair of horizontal slots 30 disposed on opposite sides thereof. A spring member 32 is assembled on the base, and comprises a retaining portion 34 disposed in the recess 26, and a pair of looped portions 36 extending inwardly therefrom on opposite sides of the stud-receiving portion. The looped portions 36 each have a stud-engaging leg 38 disposed in a slot 30 to engage and retain the stud 18. The looped portions 36 are so arranged in the socket member as to extend across a line extending between diagonally-opposed corners of the base, so that the looped portion of the spring is spaced apart from the adjacent corner for a purpose to be hereinafter described.

The attaching member 14 comprises an attaching base 40, which may be substantially square with a square opening therein as illustrated in Fig. 3, and is provided with attaching prongs 42 extending downwardly from each corner of the attaching base. Although the square attaching member is preferred for attachment by automatic machines, the attaching base may have any desired shape for hand attachment, provided the attaching prongs are so disposed thereon as to enable them to engage the socket member at the corners of the socket base, as will be hereinafter described.

To assemble the component parts of the socket assembly on the supporting sheet, the parts are aligned on opposite sides of the sheet and forced together so that the prongs 42 pierce the sheet and engage the base at the corners thereof. (See Fig. 4.) As the parts are forced further together, the prongs 42 turn outwardly on the base and pass under the retaining portion 34 of the spring and into the recess 26 at the rounded corners 27. To insure that the prongs 42 curl outwardly, the base 20 may be provided with an embossed portion 44, forming an inclined camming surface 46 for engagement by the prong ends when the parts are forced together. In some cases the ends of the prongs 42 may be pre-bent outwardly prior to assembly to assist in curling the prongs in the proper direction.

The arrangement of the spring in the socket and the prongs on the attaching member allows the prongs to engage the base without interfering with the action of the looped portion of the spring, since the prongs must always engage the base at the corners of the socket member. Since the attaching member is square, it may be applied to the socket in any one of four directions, which makes the socket assembly of the invention particularly adapted for assembly by automatic attaching machines. In such machines the component parts of the socket slide down suitably shaped troughs to the attaching mechanism. During the attaching operation with the socket assembly of the invention, it is only necessary that the square socket and the square attaching member be aligned in the attaching mechanism so that the corners of the squares are opposite one another, and consequently both the socket and the attaching cap may enter the trough in any one of four directions, and no special positioning or alignment mechanism is necessary in the machine.

Since certain obvious changes may be made in the device without departing from the scope of the invention, it is intended that all matter contained herein be interpreted in an illustrative and not in a limiting sense.

I claim:

1. A snap fastener socket member adapted for attachment to a supporting sheet by a pronged attaching cap, said socket member comprising a substantially square base having a stud-receiving portion disposed centrally therein, an upstanding peripheral wall provided with an inwardly curled free end portion providing a recess around the periphery of the base, an intermediate prong-curling portion providing camming surfaces extending inwardly and upwardly from the peripheral wall, and a spring member assembled on the base above said camming surfaces, said spring member comprising a retaining portion disposed in said recess and spaced from said base and a pair of looped portions having substantially parallel stud-engaging legs disposed on opposite sides of the stud-receiving portion, said looped portions being spaced from said spring-retaining portion and said inwardly curled portion of said peripheral wall at the corners of the base, said prong-curling portion forming a curling die to curl the prongs of an attaching cap outwardly into said recess under the spring-retaining portion when the socket member and cap are assembled on the supporting sheet.

2. A snap fastener socket member adapted for attachment to a supporting sheet by a pronged attaching cap, said socket member comprising a polygonal base having a stud-receiving portion disposed centrally thereon, an upstanding peripheral wall provided with an inwardly curled free end portion providing a recess around the periphery of the base, an intermediate prong-curling portion providing camming surfaces extending inwardly and upwardly from the peripheral wall, and a spring member assembled on the base above said camming surfaces, said spring member comprising a retaining portion disposed in said recess and spaced from the base and a pair of looped portions having substantially parallel stud-engaging legs disposed on opposite sides of the stud-receiving portion, said looped portions being spaced from said spring-retaining portion and said inwardly curled portion of said peripheral wall at opposing corners of said polygonal base, said prong-curling portion forming a curling die to curl the prongs of an attaching cap outwardly into said recess under the spring-retaining portion when the socket member and cap are assembled on the supporting sheet.

JOSEPH BLAZEJ.

REFERENCES CITED

The following references are of record in the file of this patent:

UNITED STATES PATENTS

| Number | Name | Date |
|---|---|---|
| 1,222,096 | Galt | Apr. 10, 1917 |
| 1,656,040 | Carr | Jan. 10, 1928 |
| 2,015,049 | Carr | Sept. 17, 1935 |
| 2,286,438 | Reiter | June 16, 1942 |
| 2,509,434 | Huelster | May 30, 1950 |